(12) United States Patent
Gierman (10) Patent No.: US 10,815,072 B1
(45) Date of Patent: Oct. 27, 2020

(54) TURNING DEVICE AND METHOD FOR TURNING ARTICLES ON CONVEYORS

(71) Applicant: Columbia Machine, Inc., Vancouver, WA (US)

(72) Inventor: Josh Justin Gierman, Vancouver, WA (US)

(73) Assignee: Columbia Machine, Inc., Vancouver, WA (US)

( * ) Notice: Subject to any disclaimer, the term of this patent is extended or adjusted under 35 U.S.C. 154(b) by 0 days.

(21) Appl. No.: 16/582,767

(22) Filed: Sep. 25, 2019

(51) Int. Cl.
*B65G 47/244* (2006.01)

(52) U.S. Cl.
CPC .... *B65G 47/244* (2013.01); *B65G 2203/0225* (2013.01); *B65G 2203/042* (2013.01); *B65G 2207/36* (2013.01)

(58) Field of Classification Search
CPC .................................................. B65G 47/244
See application file for complete search history.

(56) References Cited

U.S. PATENT DOCUMENTS

| 3,332,531 | A | * | 7/1967 | Chaney | B65G 47/244 198/416 |
| 4,993,536 | A | * | 2/1991 | Bell | B65G 47/244 198/374 |
| 6,032,782 | A | * | 3/2000 | Sampson | B65G 47/244 198/374 |
| 10,513,401 | B2 | * | 12/2019 | Rollwa | B65G 47/244 |
| 2018/0072510 | A1 | * | 3/2018 | Rollwa | B65G 47/244 |

* cited by examiner

*Primary Examiner* — William R Harp
(74) *Attorney, Agent, or Firm* — Schaffer IP Law, LLC (57) ABSTRACT

On a conveyor for articles traveling from an upstream to a downstream end, an assembly for turning articles is integrated for changing the orientation of the article so that the article may be proper positioned within a stack of such products on a pallet layer. The turning assembly comprises an arm that is selectively extendible along a track to a plurality of extendable positions into an article path on the conveyor. The arm includes an upstream contact surface that is configured to contact a downstream surface of the article off-axis to a center of gravity of the article so that the article rotates about the upstream contact surface to a turned position and continues downstream on the conveyor in the turned position. A turn assist plate pivots into contact with an upstream portion of the article under computer control as needed to assist with turning boxes that are particularly long.

17 Claims, 5 Drawing Sheets

FIG. 4

TURNING DEVICE AND METHOD FOR TURNING ARTICLES ON CONVEYORS

BACKGROUND OF THE INVENTION

1. Field of the Invention

The present invention relates to an assembly and method for turning articles and, more particularly, to an assembly and method used to turn articles, such as cartons, on conveyors.

2. Description of the Prior Art

Figure 1:
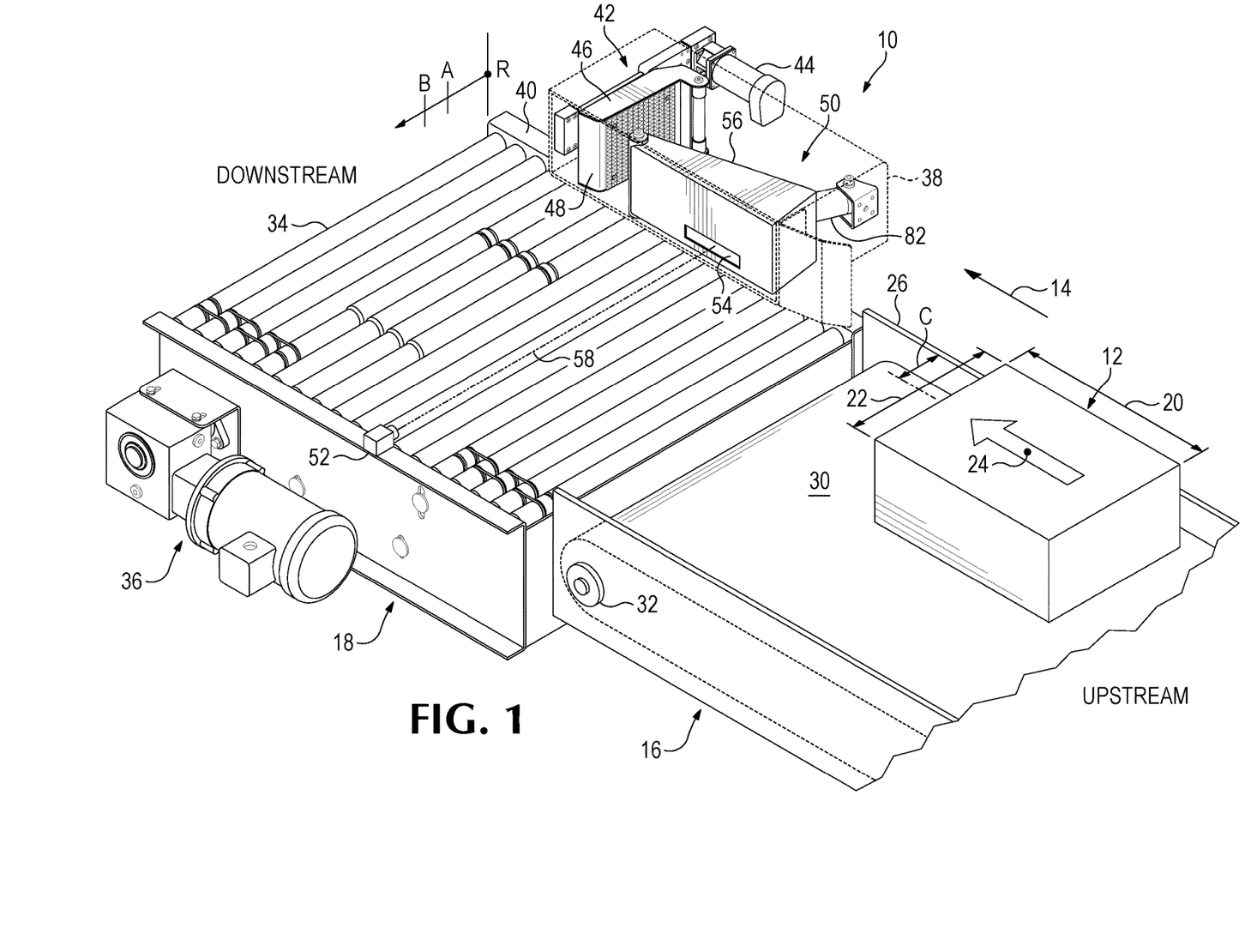
FIG. 1 is a perspective view of a conveyor with package turning device implemented according to a preferred embodiment of the invention.

In the field of palletizing, turn devices are often integrated into conveyor systems so that articles (e.g. boxes) can be turned to the proper orientation according to a desired palletizing pattern. For instance, a single layer of boxes on a pallet may require that the first two boxes be placed side-by-side along their long axis while the next two boxes placed adjacent the first two boxes but along their short axis. If all boxes are initially placed on the conveyor such that they move along their long axis, as shown in FIG. 1, then this would require that two of the boxes be rotated ninety degrees as they pass along the conveyor. Turn devices ensure that such turns are implemented.

Conveyor systems and palletizers are constructed to quickly move products from an upstream location to a palletizer section in which the product is arranged and stacked in layers for packaging and transport. There are various patterns of stacking that improve the stability of the load on the pallet. For instance, when stacking rectangular cases of consumer goods or bags of various material, the first layer of cases are arranged lengthwise along the back of the pallet and a row of cases are arranged sideways along the front of the pallet. In the next layer, the arrangement is reversed so that the back of the pallet has cases arranged sideways and the front has cases arranged lengthwise. This pattern of alternating layers is repeated until the pallet is fully loaded and the load wrapped for transport.

Pattern formation requires that the cases be properly positioned at the appropriate x-y location on the layer and in the needed orientation. This pattern formation is complicated by the fact that there may be many such patterns required for various goods and that variations in case sizes may require customized configuration of the palletizing equipment. That is, while conveyors are typically linear and have a single lane along which goods pass, cases within a palletized layer would have to be laterally positioned differently from adjacent cases. This may require lateral movement of the downstream end of the single-lane conveyor or, alternately, movement of the case to a fixed lateral lane along a multilayer conveyor. Such cases, however, would still need to be turned in order to properly orient the cases within the pallet layer.

Stacking with alternate rows improves the stability of the pallet because seams are overlaid and the cases contact multiple cases on adjacent layers. This in contrast with stacking using the same pattern where each case is in a single uniform column of such cases that are not stabilized by overlapping and thus stand a greater chance of collapsing.

One problem with stacking with alternating layers is that the orientation of the cases must be necessarily turned so that the product can be placed in either lengthwise or sideways fashion on the pallet. While such turning had been done manually, more modern equipment turn product using automated turners such as U.S. Pat. No. 6,032,782, owned in common by the assignee of the present invention. The turners operate by driving the product against a turning surface that is off axis to the direction of movement of the product along the conveyor. This causes the product to pivot around the turning surface so that it rotates exactly ninety degrees. Such turners are typically static, and pattern formation is limited to a particular preset pattern rather than dynamic as might be required when stacking products of different sizes or configurations.

Even more important problem arises when the products within the cases are particularly fragile. In the packaging industry, there is a push to reduce product packaging and this often results in less protection for the product. Such trends also often require that the conveyor and palletizer system be capable of handling a larger variety of cases or packages. Companies that previously placed their finished product into corrugated boxes, for example, are now opting to place the product into a small tray to loosely contain the product. These companies may also only use shrink film with no separation between fragile products. These impact sensitivities are combined with an increasing requirement to handle multiple case sizes on a single product conveyor line while also keeping maximum throughput at minimum cost.

Other challenges within the palletizing industry include dealing with packages that are differently weighted and thus impact with different forces on the turner, require turning of the article to a specific orientation that is not orthogonal, and/or are contained in boxes that are much longer than they are wide. For differently weighted packages, improperly designed turning mechanisms can cause product breakage. For non-orthogonal turning, precise control of the turning surface is required. And longer boxes may have trouble turning with "bump"-style turners and thus impact the speed at which the palletizer operates.

Accordingly, the need arises for a turning device design that is better capable of addressing these challenges while minimizing drawbacks of existing prior art solutions.

SUMMARY OF THE INVENTION

The present invention involves an assembly for turning articles traveling on a conveyor that has a path with an upstream end and a downstream end. The turning assembly comprises an arm that is selectively extendible to a plurality of extendable positions into an article path on the conveyor. The arm includes an upstream contact surface that is configured to contact a downstream surface of the article off-axis to a center of gravity of the article so that the article rotates about the upstream contact surface to a turned position and continues downstream on the conveyor in the turned position. To extend the arm the desired length with precision, an actuator moves under control of a servo motor to drive the actuator coupled to the arm along a rail system to a nearly infinite number of selectable distances.

In an alternate implementation, the present invention describes an assembly for turning articles comprising a housing coupled to one edge of a conveyor along which articles move within a lane from an upstream end to a downstream end of the conveyor. A turning device is mounted within the housing and moveable between at least three positions, including a retracted position located fully within the housing, a first active position configured to extend into a lane of one of the articles to be turned by a first distance, and a second active position configured to extend into the lane of the one article to be turned by a second distance, different from the first distance. An actuator is additionally coupled to the turning device for moving the turning device between the at least three positions. Finally, computer control is coupled to the actuator and to the turning device and has a programmed pattern in memory for selectively moving the turning device between the retracted position and at least the first active position or second active position for successive articles responsive to the programmed pattern.

An inventive method for turning an article traveling on a conveyor uses an assembly that includes a conveyor having a path with an upstream end and a downstream end, a turning station including a surface for turning an article driven into contact with the surface by the conveyor, a retractable guide member for selectively activating the surface, a sensor for sensing an approaching first article located upstream from the surface, and further having a computer controller for selectively activating the guide member responsive to information received from the sensor. The method comprises the steps of sensing the approach of an article traveling from the upstream end of the path of the conveyor and sending information from the sensor to the computer controller. The method for turning the articles further selectively activates the guide member, responsive to information received by the computer controller from the sensor, so as to interpose the surface for turning the article a selected one of a plurality of distances into the path of the article if the article is to be turned; otherwise, maintaining the guide member in a retracted position so that the surface is not interposed within the path. An impact between the article and the surface is dampened, and, responsive to a timing trigger, the method optionally operates to extend a turn-assist surface into the path against an upstream portion of the article.

In summary, this device is used to turn cases or packages that are being conveyed on a roller conveyor or other driven conveyors. The device allows one case to be turned, and then it can retract to allow the next case to pass by undisturbed. The primary moving component is the turn shoe. It is a steel face with a nitrile belting affixed to the face where cases come into initial contact. As the case contacts the turn shoe, the rollers will continue to drive it forward causing it to rotate 90 degrees as it pivots around the turn shoe. The mechanism that moves the turn shoe into the path of the case is a servo operated belt driven slide. The servo allows the turn shoe to be automatically positioned at different extensions. This feature allows the turn shoe to efficiently turn many different sizes of cases without any operator intervention. Large cases require more extension while smaller cases require less.

The turn shoe is also able to pivot to allow the cushioning cylinder to dampen the impact of incoming cases. The cylinder has an electronically adjusted air pressure regulator supplying the extension port on the cushioning cylinder. When a case with sensitive product such as glass jars impact the turn shoe, the cushioning cylinder dampens that impact. The level of dampening can be automatically adjusted with the electronic air pressure regulator to accommodate for a large variety of case sizes and impact sensitivity requirements.

The last moving element is the turn assist. This armature has a pneumatic cylinder that pivots it out at a specified time to help start the rotation of the case.

In applications that feed packaging equipment, operators can use a computer to keep track of what product is being conveyed, and which cases need to be turned. The turn shoe extension, cushioning cylinder pressure, and turn assist timing are all adjusted to match the presets for each case as it passes a photo eye beam that is aimed across the conveyor approximately in the middle of the turn assist armature. The settings immediately change to the requirements for that case. As a case is turning another case may enter the photo eye beam and the settings will adjust to that case.

The purpose of this turning device is to be a low cost versatile turning device that can handle a very large range of case sizes and case impact sensitivity requirements efficiently and automatically. By having the turn shoe positioned at the exact optimal extension one can control how much a case will turn. For example, 80 degrees, 85 degrees or a complete 90 degree turn. One can also control how fast it will turn. Fast turning is critical to throughput. With this design operators can do that for multiple case sizes automatically. The benefit of the cushioning cylinder is that the automatic pressure regulator allows the dampening sensitivity to be adjusted for a wide variety of cases automatically. The combination of the automatically adjusted turn shoe extension, cushioning cylinder pressure, and turn assist result in the unique ability to fine tune this turning device to optimal turning speed and case dampening. The benefits of these features maximizes throughput, reduces damaged product, and minimizes operator intervention.

The foregoing and other objects, features and advantages of the invention will become more readily apparent from the following detailed description of a preferred embodiment of the invention that proceeds with reference to the accompanying drawings.

DETAILED DESCRIPTION

FIG. 1 shows a turning device 10 constructed according to teachings of the present invention, which is integrated with a conveyor system for controllably turning packages, such as box 12, to a desired orientation for palletizing. As shown, box 12 (also referred to herein as a package or article) travels downstream 14 along a conveyor system, such as belt conveyor 16 and roller conveyor 18, from an upstream end—where the box is initially positioned on the conveyor—to a downstream end—where the box is ultimately palletized into a patterned layer (not shown).

In the example shown in FIG. 1, box 12 is oriented on belt conveyor 16 where its length 20 is parallel to its direction of travel 14, and its downstream-facing expanse is along a width 22 of the box 12. It will be appreciated in light of the examples shown in Table 1 further below, however, that the box may be oriented along its width 22 so that the downstream-facing expanse that contacts the turning device is along the box length 20.

Box 12 includes a center of mass 24, typically half its width and half its length, whose location is used to preprogram and properly extend the turning means of the device 10 as noted further below. A case guide located further upstream (not shown) acts to move box 12 adjacent an edge 26 of conveyor 16 so that the box center of mass 24 is spaced a known distance C from conveyor edge 26.

Box 12 sits on the belt 30 of conveyor 16 and is driven downstream as the belt moves forward on motorized rollers, such as downstream roller 32. Box 12 then transitions onto a second conveyor, such as roller conveyor 18, where it continues downstream on powered rollers (such as roller 34) driven by motor 36.

Turning device 10 generally includes a housing 38 coupled along one edge 40 of conveyor 18. A primary turning device 42 is mounted within the housing as shown in FIG. 1, but is moveable under operation of motor 44 as described further below to extend a turning shoe 46 out over the conveyor 18 and into the path of the box 12. Motor 44 moves turning shoe 46 from a retracted position, where the tip 48 of turning shoe 46 is not extended into the path of the box as shown by point R, to one of a plurality of possible extended positions such as first active extended position A or second active extended position B. Either extended position A or B are selected by computer control so that the spacing of the box center of mass 24 from the conveyor edge 26 (here distance C) is greater than the selected extended position. Based on the box speed and weight, as well as the difference between distance C and the extended position A or B, box 12 will contact the turning shoe 46 off-axis to the center of gravity 24 of the box so that the article rotates about the upstream contact surface (here, width 22) to a turned position and continues downstream on the conveyor in the turned position.

Experimentation has determined that the extension value (e.g. extension value A) is approximately twice that of the lateral distance C of the box 12 center of mass 24 from the conveyor edge 26 and/or 40. So the value C=2*A is initially used as a starting point to determine the proper extension of the turning shoe 46 to effect the desired turn. However, the final value A may be affected by such criteria as the speed of the conveyor 18, the coefficient of friction between the box 12 and the conveyor 18, the weight of the box 12, the distribution of articles within the box 12, and the initial orientation and dimensional ratio of the box 12. For instance, in situations where the ratio of side edge (e.g. box length 20) to leading edge (e.g. box width 22) is a small value—such as in the example for Case C shown in Table 1 further below—the extension length A may necessarily be even smaller than the value of C/2 to achieve complete turns.

Turning device 10 also includes a turn-assist assembly 50 upstream of the primary turning device 42. A photoelectric eye 52 mounted to an opposing side edge of conveyor 18 points toward a reflecting surface on turning device 10 (here a reflecting surface 54 on assist plate 56) to establish a detection plane 58. When box 12 moves downstream and breaks this detection plane 58, computer control (described further below) operates the primary turning device 42 and turn-assist assembly 50 according to programmed operation that takes into account the size, weight, and orientation of the box 12 and the desired palletizing pattern needed downstream.

Figure 2:
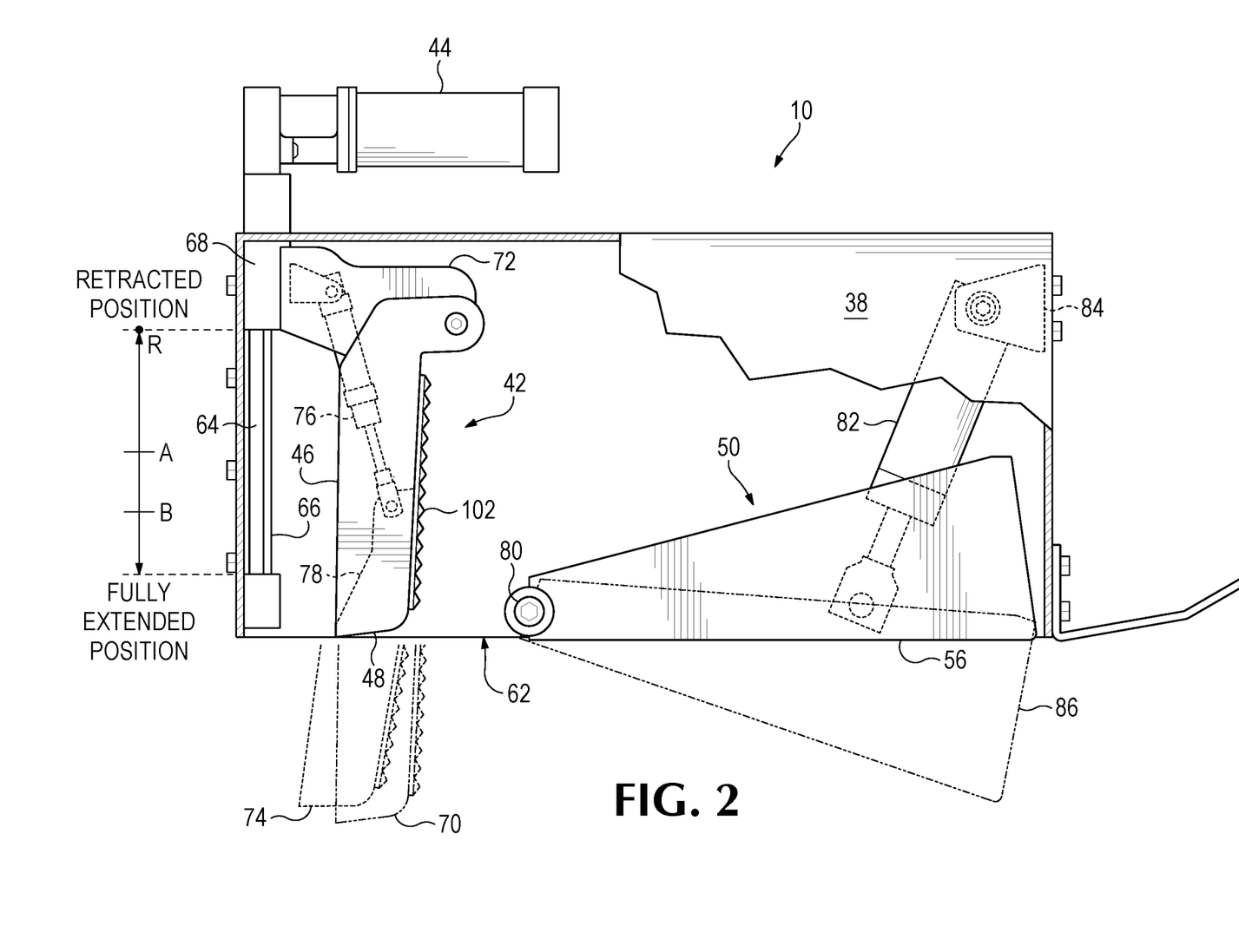
FIG. 2 is a partial section plan view of the packaging turning device of FIG. 1, shown in a retracted position in solid lines and in an extended position and cushioned impact position with phantom lines.
Figure 3:
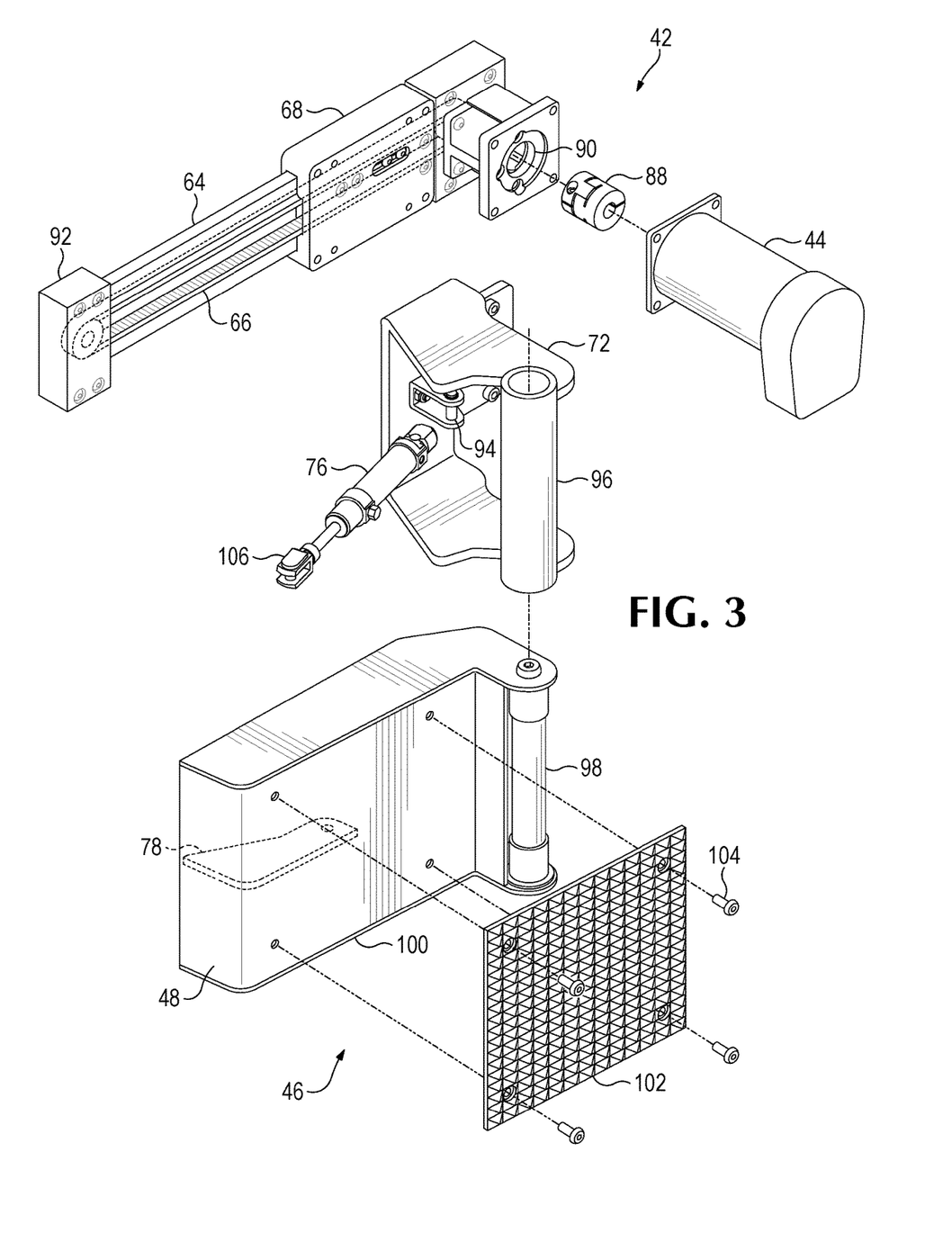
FIG. 3 is an exploded perspective view of a primary portion of the package turning device of FIG. 1, particularly the turning shoe and actuator assembly and cushioning cylinder.

FIG. 2 shows a partially sectioned view of turning device 10 where lead-in plate 60 is attached to an upstream portion of the turning device housing 38. Boxes 12 that are not properly positioned on conveyor 18 would contact the lead-in plate 60 and be guided so that an adjacent box edge is parallel to and properly spaced from (or, more typically, immediately adjacent to) an active edge 62 of the turning device 10 adjacent conveyor edge 40. A track 64 (here two parallel tracks as shown in FIG. 3) is mounted against an interior wall of housing 38 and runs substantially perpendicular to the conveyor edge 40 and active edge 62 of the turning device. A belt drive 66 running parallel with the track 64 is operatively coupled to motor 44 and is geared to drive via servo so that the advance of the belt drive is by a highly controlled amount. A runner 68 is slidably moveably along the length of track 64 and moves under operation of belt drive 66 between retracted R and fully extended positions, or any designed position between (e.g. positions A or B), as dictated by computer control and implemented by the servo motor. Under control of the servo motor 44, therefore, the runner acts as an actuator to extend turning shoe 46 into the path of the article to be turned, dictated by the encoder resolution of the servo motor 44. In one example, for instance, the servo motor 44 with an 800 count encoder would have a linear resolution of 0.005 inches, meaning that the position of runner 68 can be advanced in 0.005 inch increments. Turning shoe 46 is shown in a first extended position by the shadow outline at 70 when the runner 68 slides to position A along track 64.

A frame 72 is fixedly attached to runner 68. Turning shoe 46 is pivotally mounted to frame 72 of the actuator so that the shoe rotates in a downstream direction (shown by shadow outline 74) upon impact with box 12. To cushion a deflection of the turning shoe 46 upon impact with box 12, the shoe and actuator are biasedly coupled together to allow a decelerating travel of the turning device between an impact position (e.g. outline 70) and an end position (e.g. outline 74) so that the impact of the article to be turned with the turning device is cushioned. In a preferred implementation, the bias coupling includes a actuator cylinder 76 that is pivotally mounted to frame 72 on one end and to a structural fin 78 formed along the interior of the turning shoe 46 on the other. Actuator cylinder 76 is coupled to air source pump (FIG. 4) that charges the cylinder with a pre-set air pressure under computer control as described further below. As greater charge pressure is needed to properly decelerate a heavier article than a light one, or one traveling faster, then the computer control is capable of changing the operational parameters of the electronic air regulator 112 to charge the actuator cylinder from the air source pump 116 with a first pressure amount for a first type of article and a second pressure amount for a second type of article.

Figure 4:
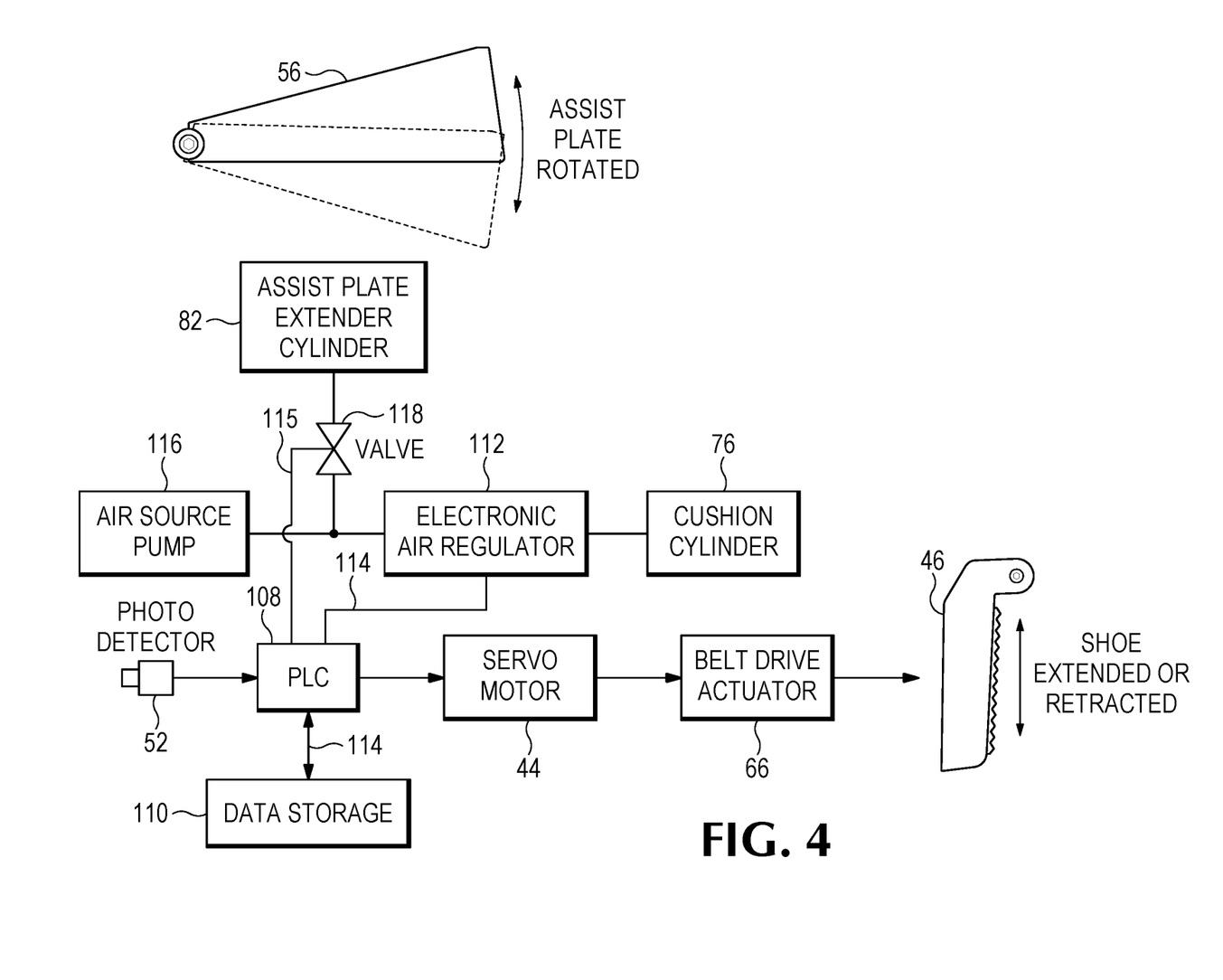
FIG. 4 is a schematic diagram of the control system for the package turning device of FIG.

FIG. 2 also shows further details of the turn assist assembly 50, which is maintained within the turning device housing 38 upstream of the primary turning device 42. A turn assist plate 56 is pivotally mounted to the housing 38 at pivot point 80 on a downstream end of the plate 56. An assist plate cylinder 82 is pivotally mounted on one end to a fixed framework 84 of the housing 38 and on another end to the turn assist plate 56. Assist cylinder 82 is selectively charged with an air pressure responsive to computer control in order to pivot the assist plate (shown by shadow outline 86) into the lane and bear against a side of the box (e.g. the length 20 adjacent the conveyor edge 40). When activated as shown by shadow line 86, the assist plate contacts an upstream edge of box 12 in order to help start the rotation process for larger packages when the leading edge of box 12 impacts upon turning shoe 48. The air lines leading separately to cylinders 76 and 82 are schematically shown in FIG. 4.

FIG. 3 shows an exploded view of the primary turning device 42. In operation, motor 44 engages with coupling 88, which in turn rotates gearworks (not shown) within the actuator assembly aperture 90. The gearworks controllably advance belt drive 64 so that the attached runner 68 slides along tracks 62 to an operable extended position. This operable extended position can be any location between the fully retracted position shown in FIG. 3 and a fully extended position where runner slides 68 all the way to the left against mounting block 92.

As also described with reference to FIG. 2, framework 72 is fixedly attached to and advances to an operable extended position with runner 68. Framework 72 includes a pivot attachment point 94 to which a proximal end of actuator cylinder 76 is attached. A hinge knuckle 96 is formed on a distal end of the framework 72 and is configured to capture a hinge pin 98 structure of turning shoe 46 so that the turning shoe 46 can pivotally flex with respect to the fixed framework 72 upon impact with the article (e.g. box 12) to be turned.

Figure 5A:
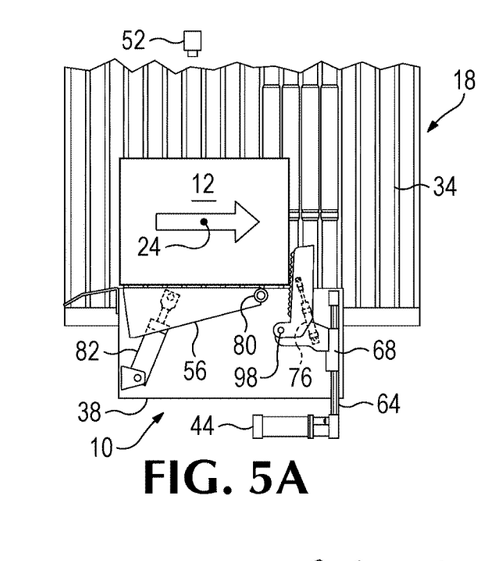
FIGS. 5A to 5E are plan views showing progressive turning sequences of a package on the conveyor of FIG. 1 using the turning device of the present invention.

The turning shoe body 46 is a steel framework 100 having a proximal tip 48 that defines the furthest extent to which the shoe extends into the path of the article to be turned. A nitrile belting 102 forms an upstream impact surface of the turning shoe 46 and is affixed to the upstream face of framework 100 via screw attachments 104. The shoe body 46 is structured with a structural fin 78, where the distal end of actuator cylinder 76 includes a mounting pin assembly 106 that engages with fin 78. Cylinder 76 compresses when belting 102 is impacted, thus pivoting the turning shoe 46 in a downstream direction by a decelerating amount that acts to cushion the blow of the box 12 against the shoe 46. The upstream contact surface of framework 100 is at a non-perpendicular angle with respect to the article path as best seen in FIGS. 2 and 5A. Preferably, this angle is between about zero and five degrees. When the article to be turned 12 contacts the shoe 46, it first contacts a proximal surface on the upstream contact surface closer to the pivot pin 98 and then rotates around the distal tip 58 of the shoe 46 to the turned position as the conveyor 18 continues driving the box 12 downstream.

FIG. 4 shows the operational components of the turning device 10 schematically so as to understand the use of computer control to regulate the turning process. A programmable logic controller (PLC) 108 is coupled to a data storage device 110 that stores data associated with the types of packages to be turned, and the palletizing patterns desired. An example of the type of data stored is shown in Table 1 below, in which:

TABLE 1

Turn Control Settings for Different Case Sizes and Orientations

|  | Case A | Case B | Case C | Case D |
| --- | --- | --- | --- | --- |
| Case Length (in) | 8 | 18 | 18 | 24 |
| Case Width (in) | 6 | 12 | 12 | 20 |
| Case Weight (lbs) | 5 | 15 | 15 | 40 |
| Orientation/Leading Edge (in) | 6 | 12 | 18 | 20 |
| Turn Shoe Extension (in) | 1.5 | 3 | 4 | 5 |
| Cushion Cylinder Pressure (psi) | 5 | 15 | 10 | 30 |
| Turn Assist Start Delay (sec) | N/A | 0.2 | N/A | 0.2 |
| Assist Activation (sec) | N/A | 0.11 | N/A | 0.15 |

Data sets stored within the data storage device 110 can include the dimensions and weights for a plurality of different articles or cases and the operational commands associated with each of the cases.

For instance, Case A has a length of 8 inches, a width of 6 inches, a weight of 5 pounds, and an initial orientation as shown in FIG. 1 where the length of the case is parallel to the direction of travel 14. When Case A breaks the detection plane 58 of photo detector 52, servo motor 44 is operated so that the runner 68 moves along track 66 to an activated position a total of 1.5 inches from its retracted point R. Since the runner 68 and turning shoe 46 are coupled together, the tip 48 of the turning shoe 46 would also extend to an activated position and into the article path 1.5 inches beyond the active edge 62 of the turning device 10. Simultaneous with extension of the turning shoe to its activated position, PLC 108 would engage the electronic air regulator 112 over control line 114 so as to let 5 psi of pressured air from air source pump 116 into cushion cylinder 76. Case A would then impact the nitrile surface 102 of turning shoe 46 and then rotate to an orthogonal position. As Case A is smaller and lighter, experimentation has shown that a turn assist is not needed (thus "N/A") and therefore instructions from the PLC 108 along control line 115 do not trigger activation of valve 118 and would therefore not charge the assist plate extender cylinder 82.

Case B is a much larger and heavier article and thus requires different operational commands from Case A. A computer receives an input from a HMI (user interface), or an upstream computer, telling the local computer that articles of type Case B are coming down the conveyor and adjusts the operational parameters accordingly. In this instance, the turning shoe 46 is extended to 3 inches, which is double that programmed for Case A, and the cushion cylinder 76 is charged with an air pressure of 15 psi, which is triple that of Case A. Larger articles require that the cushion cylinder be 'stiffer' in order to properly cushion the impact of the article with the turning shoe, and thus the cylinder would need to be charged with a higher pressure. When case B breaks the detection plane 58, PLC 108 starts a timer and instructs the electronic air regulator 112 to set a pressure fed to cushion cylinder at 15 psi, and to then open valve 118 for 0.11 seconds beginning 0.2 seconds after detection to thereby rotate assist plate 56 into engagement with the side of Case B. After the 0.11 seconds of extension, the PLC 108 instructs valve 118 to retract the assist plate 56 as shown in FIG. 5C. As described above, the assist plate 56 contacts the long side of Case B and helps push the back end of the article so that the front end rotates around the turning shoe 46 to its turned position.

Case C is an example of where the case is oriented so that the leading edge of the case is its long side. In this example, the servo motor 44 is operated by PLC 108 to extend the turning shoe 46 a total of 4 inches, on account of the long 18 inch article surface that the shoe must contact. The cushion cylinder charge is set to 10 psi. This charging pressure contrasts with the 15 psi for Case B because, even though the weights of the two cases are the same, the center of gravity of Case C (which is 9 inches from the edge) is further away (e.g. 5 inches) from the tip 48 of turning shoe 46 than Case B (3 inches), and thus the impact inertia is less and Case C is more easily able to rotate to its turned position. Because Case C is more easily able to turn, no turn assist is needed and valve 118 is not opened to charge plate extender 82.

Finally, Case D shows an example of a case that is nearly square but very heavy. In this case, the shorter side (20 inches) crosses detection plane 58 and triggers the PLC to extend the turning shoe by 5 inches. Simultaneously, electronic air regulator 112 activates the cushion cylinder, charging it with an air pressure of 30 psi. Similarly, a delay timer is activated and valve 118 opened 0.2 second afterwards for a total of 0.15 seconds in order to ensure enough time for the leading edge of Case D to reach the turning shoe 46 and for the assist plate 82 to extend into the side of the case and help turn the case around the turning shoe.

The data sets of Table 1 are only exemplary, and different and/or additional criteria may be entered into the PLC control data set. For instance, the data set can be sequentially listed to accommodate different pattern types so that the turn shoe extension can be retracted (e.g. Turn Shoe Extension value set to "N/A") for every other box that crosses the detection plane 58 so that only every other box is turned. Similarly, different box types within the pattern would trigger use of different data sets to properly charge the cylinders 76, 82 and trigger the turn device. As such, the invention is not intended to be limited to any type of pattern, data set, or mechanism.

FIG. 5A to 5E illustrate the sequential steps in which a box 12 is turned on conveyor 18 using the turning device 10 according to methods of the present invention. In FIG. 5A, a photo eye 52 detects cases approaching the turn device. FIG. 5A shows the moment of impact. The actual extension position, cushioning pressure and assist timing are all preset based on testing of the specific case being conveyed. The settings for a specific case are stored in the computer data storage 110 and implemented by the PLC 108 as per the sequences noted above in a discussion of FIG. 4. Responsive to a selection (or automatic detection) of the type of article to be turned, the turn device changes all the turn settings based on pre-determined values stored in the computer.

Figure 5B:
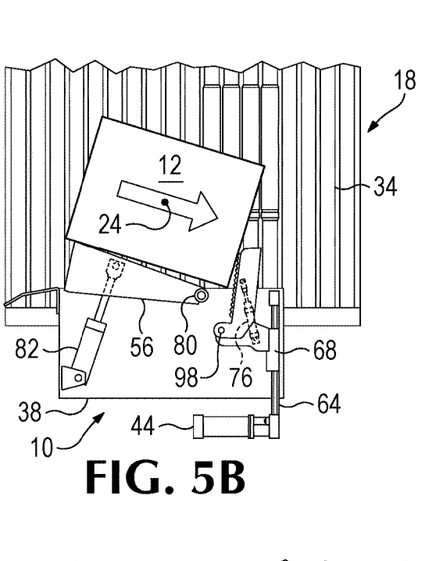
Figure 5C:
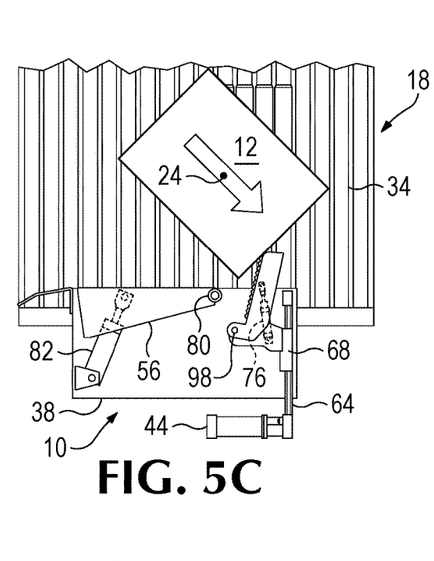
Figure 5D:
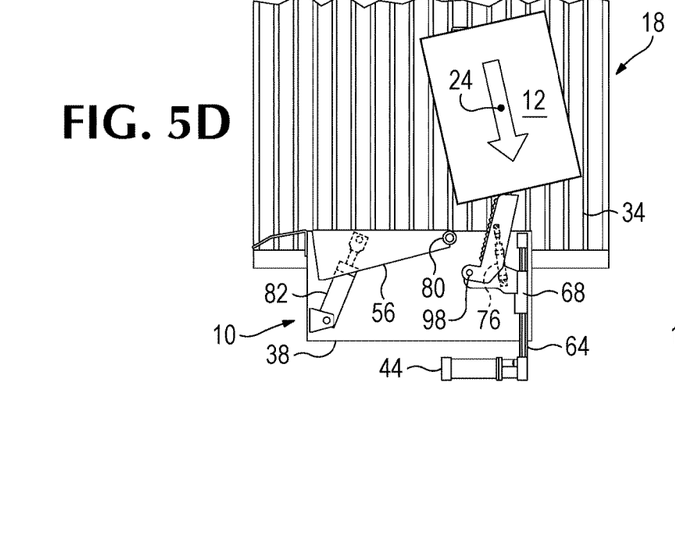
Figure 5E:
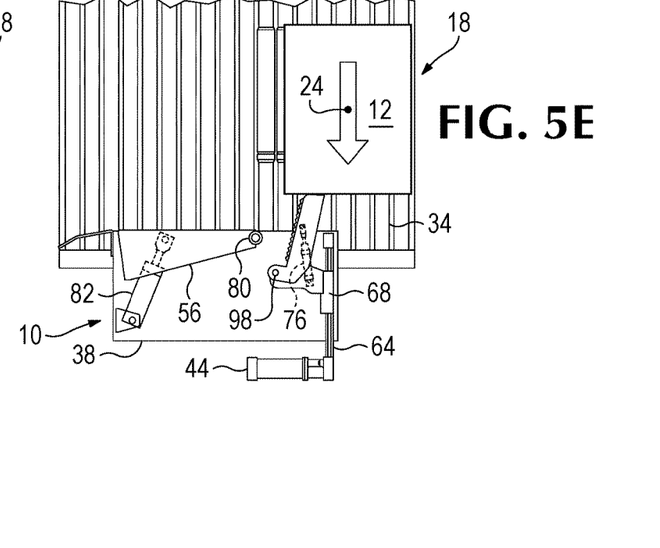

FIG. 5B shows the moment immediately after impact, where the cushioning cylinder 76 is charged and compresses in order to cushion the impact and decelerate the box and its contents so that fragile items are better protected. The assist cylinder 82 is charged and extended so as to rotate the assist plate 56 about its pivot point 80 and against the rearward side edge of the box 12. The rear of the box is thus tipped upward and, as the motorized rollers 34 continue to drive the box 12 forward, the rear end of the box 12 rotates around the tip of turning shoe 46 (FIGS. 5C and 5D) until the box is fully rotated to its turned position (FIG. 5E). The assist cylinder is decharged and retracts the assist plate back into the housing 38 of the turn assembly 10.

The use of shorter extensions for the turn shoe can be utilized to reduce the turned angle if an acute turning angle of less than 90 degrees is desired. A non-orthogonal turn of the article might be desired in order to minimize the impact of a particularly fragile case further downstream. If the leading edge of the case is fully parallel to a stopping face, such as at a palletizing layer assembly station located downstream of the turning station as described herein, then the impact would be greater than with a case where its leading edge is slightly askew to the stopping face of a collection bar or similar structure at the layer formation station. This reduction of the staggering impact of the case reduces possible breakage of the contents of the case, as well as allowing the conveyor to be run at higher speeds without breakage than with fully turned boxes and thus speeding up the palletizing process.

Having described and illustrated the principles of the invention in a preferred embodiment thereof, it should be apparent that the invention can be modified in arrangement and detail without departing from such principles. For instance, it is understood that the cushioning cylinder can also be configured with any biasing means such as a coil spring, and that the turn assist cylinder can be hydraulic in nature. Accordingly, we claim all modifications and variation coming within the spirit and scope of the following claims.

What is claimed is:

1. An assembly for turning articles traveling on a conveyor having a path with an upstream end and a downstream end, the assembly comprising:
    an arm selectively extendible a plurality of extendable positions into an article path on the conveyor and having an upstream contact surface configured to contact a downstream surface of the article off-axis a center of gravity of the article so that the article rotates about the upstream contact surface to a turned position and continues downstream on the conveyor in the turned position;
    a track running perpendicular to the article path, the arm moveable along the track to one of a plurality of selectable distances into an article path; and
    an actuator that is slidingly moveable along the track, wherein the arm is pivotally attached to the actuator and configured to flex the arm in a downstream direction in response to contact of the article with the arm.

2. The assembly of claim 1, further including a piston coupled between the actuator and the arm upward of the pivot point for biasing the arm in an extended position substantially perpendicular to the article path.

3. The assembly of claim 1, further including a motor coupled to the actuator and operated responsive to computer control to move the actuator along the track to one of the selectable distances.

4. An assembly for turning articles traveling on a conveyor having a path with an upstream end and a downstream end, the assembly comprising:
    an arm selectively extendible a plurality of extendable positions into an article path on the conveyor and having an upstream contact surface configured to contact a downstream surface of the article off-axis a center of gravity of the article so that the article rotates about the upstream contact surface to a turned position and continues downstream on the conveyor in the turned position, wherein the upstream contact surface is nitrile belted surface.

5. An assembly for turning articles traveling on a conveyor having a path with an upstream end and a downstream end, the assembly comprising:
    an arm selectively extendible a plurality of extendable positions into an article path on the conveyor and having an upstream contact surface configured to contact a downstream surface of the article off-axis a center of gravity of the article so that the article rotates about the upstream contact surface to a turned position and continues downstream on the conveyor in the turned position, wherein the upstream contact surface is disposed at an non-perpendicular angle with respect to the article path so that the article first contacts a proximal surface on the upstream contact surface and rotates around a distal surface to the turned position.

6. The assembly of claim 5, further including an actuator that is slidingly moveable along a track, wherein the arm is pivotally attached to the actuator and configured to flex the arm in a downstream direction in response to contact of the article with the arm.

7. An assembly for turning articles traveling on a conveyor having a path with an upstream end and a downstream end, the assembly comprising:
    an arm selectively extendible a plurality of extendable positions into an article path on the conveyor and having an upstream contact surface configured to contact a downstream surface of the article off-axis a center of gravity of the article so that the article rotates about the upstream contact surface to a turned position and continues downstream on the conveyor in the turned position; and a supplemental turning device coupled to the conveyor upstream of the arm, the supplemental turning device comprising:

an assist plate pivotally coupled at a downstream end so that an upstream end pivots into contact with an upstream portion of the article responsive to contact of the article with the arm.

8. An assembly for turning articles, comprising:

a housing coupled to one edge of a conveyor along which articles move within a lane from an upstream end to a downstream end of the conveyor;

a turning device mounted within the housing and moveable between at least three positions, including a retracted position located fully within the housing, a first active position configured to extend into a lane of one of the articles to be turned by a first distance, and a second active position configured to extend into the lane of the one article to be turned by a second distance, different from the first distance;

an actuator coupled to the turning device for moving the turning device between the at least three positions;

computer control coupled to the actuator and to the turning device and having a programmed pattern in memory for selectively moving the turning device between the retracted position and at least the first active position or second active position for successive articles responsive to the programmed pattern;

a track within the housing running substantially perpendicular to the one edge of the conveyor;

a belt drive running parallel with the track;

a motor activated by the computer control to operate the belt drive; and a runner coupled to the belt drive for enabling the runner to be slidably moveable along the track along a length of the track so that the turning device, coupled to the runner moves between the at least three positions.

9. The assembly of claim 8, wherein the motor is a servo motor having an encoder with a designated resolution.

10. An assembly for turning articles, comprising:

a housing coupled to one edge of a conveyor along which articles move within a lane from an upstream end to a downstream end of the conveyor;

a turning device mounted within the housing and moveable between at least three positions, including a retracted position located fully within the housing, a first active position configured to extend into a lane of one of the articles to be turned by a first distance, and a second active position configured to extend into the lane of the one article to be turned by a second distance, different from the first distance;

an actuator coupled to the turning device for moving the turning device between the at least three positions, wherein the turning device and actuator are coupled for pivotal movement of the turning device with respect to the actuator upon impact of the article to be turned with the turning device; and computer control coupled to the actuator and to the turning device and having a programmed pattern in memory for selectively moving the turning device between the retracted position and at least the first active position or second active position for successive articles responsive to the programmed pattern.

11. The assembly of claim 10, further including a bias coupling between the turning device and the actuator to allow a decelerating travel of the turning device between an impact position and an end position so that the impact of the article to be turned with the turning device is cushioned.

12. The assembly of claim 11, wherein the bias coupling includes an actuator cylinder charged with an pre-set air pressure by the computer control.

13. The assembly of claim 12, wherein the computer control is operative to charge the actuator cylinder with a first air pressure for a first type of article to be turned and a second, different air pressure for a second type of article to be turned.

14. An assembly for turning articles, comprising:

a housing coupled to one edge of a conveyor along which articles move within a lane from an upstream end to a downstream end of the conveyor;

a turning device mounted within the housing and moveable between at least three positions, including a retracted position located fully within the housing, a first active position configured to extend into a lane of one of the articles to be turned by a first distance, and a second active position configured to extend into the lane of the one article to be turned by a second distance, different from the first distance;

an actuator coupled to the turning device for moving the turning device between the at least three positions;

computer control coupled to the actuator and to the turning device and having a programmed pattern in memory for selectively moving the turning device between the retracted position and at least the first active position or second active position for successive articles responsive to the programmed pattern; and an assist plate maintained within the housing upstream of the turning device and coupled to an assist plate cylinder selectively charged with air pressure responsive to computer control in order to pivot the assist plate into the lane and bear against an upstream portion of the article to be turned.

15. A method for turning an article for use in an assembly for turning articles traveling on a conveyor, with the assembly including a conveyor having a path with an upstream end and a downstream end, and a turning station including a surface for turning an article driven into contact with the surface by the conveyor, a retractable guide member for selectively activating the surface, a sensor for sensing an approaching first article located upstream from the surface, and further having computer controller for selectively activating the guide member responsive to information received from the sensor, the method comprising the steps of:

sensing the approach of an article traveling from the upstream end of the path of the conveyor;

sending information from the sensor to the computer controller;

selectively activating the guide member, responsive to information received by the computer controller from the sensor, so as to interpose the surface for turning the article a selected one of a plurality of distances into the path of the article if the article is to be turned, otherwise maintaining the guide member in a retracted position so that the surface is not interposed within the path;

dampening an impact between the article and the surface; and responsive to a timing trigger of the article crossing a detection plane, extending a turn-assist surface into the path against an upstream portion of the article.

16. The method of claim 15, wherein the step of dampening an impact between the article and the surface includes precharging a cylinder that is coupled with the surface with a fluid pressure responsive to the a preset value stored within the computer controller.

17. The method of claim 16, wherein the fluid pressure is an air pressure.

\* \* \* \* \*